3,326,889
FLUORINATED AZO COMPOUNDS
Harvey A. Brown, East Oakdale Township, Washington County, Minn., assignor to Minnesota Mining and Manufacturing Company, St. Paul, Minn., a corporation of Delaware
No Drawing. Filed Jan. 4, 1965, Ser. No. 423,902
6 Claims. (Cl. 260—192)

This invention relates to new and novel fluorinated organic azo compounds.

Fluorine is known to be the most electronegative element, i.e. it is an oxidizing agent with very high potential. Among its possible uses are industrial processes in which high oxidizing potential could extend the range of application, increase rate of output and the like. However, fluorine is a very low boiling and highly corrosive gas requiring rather special techniques in its manipulations. For this reason its use has been limited and many industrial requirements have been met, more or less satisfactorily by using less powerful and more readily handled oxidizing agents. However, highly active oxidizing agents like fluorine would be advantageous in industrial uses such as bleaching of wood pulp, fabrics and the like if they could be readily handled.

Another field in which very high oxidation potentials are particularly desirable is that of reaction-type propellants where extreme releases of energy are necessary to achieve high specific impulses. For such purposes it is very desirable to have available relatively safely handled materials possessing even a substantial fraction of the oxidizing capacity of fluorine.

It is known that the oxidizing potential of fluorine is retained to a considerable extent when the fluorine atom is bonded covalently to nitrogen, e.g., in the fluoramino groups, $-NF_2$ and $=NF$. Compounds containing a plurality of these fluoramino groups have useful oxidizing power. When such groups are attached to residues which have carbon and nitrogen atoms, the compounds can be handled more conveniently than fluorine. The azo group has now been found to be compatible with fluoramino groups.

While azo derivatives are a well known class of compounds, so far as is known no perfluorinated azo compounds of the type described herein have been heretofore available.

It is an object of this invention to prepare certain new organic compounds containing the azo functional group.

It is another object of the invention to provide fluorinated oxidant compounds.

Other objects will be apparent from the disclosure herein made.

In accordance with the above and other objects of the invention, novel organic compounds are provided which contain the azo group and otherwise consist essentially of nitrogen, carbon and fluorine said compounds having 2 carbon atoms and from 3 to 6 nitrogen atoms, at least one of which is fluorinated, and being further characterized by containing from about 30 to 70 percent by weight of fluorine and having no carbon-carbon bonds.

The compounds of the invention have the formula

R—N=N—R' wherein R and R' each contain one carbon atom bonded directly to the azo nitrogen. R and R' need not be the same and can be either monovalent groups such as $NF_2CF_2-$, $FN=CF-$, $(NF_2)_2CF-$, $NF_2C(=NF)-$, $CF_3-$, $C=N-$, and the like, or, taken together, they can form a ring through the azo nitrogen atoms to which they are bonded. These divalent R—R' groups include

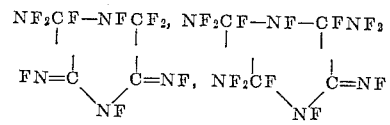

and the like.

Illustrative compounds of the invention, and the percent by weight of fluorine in each, are as follows:

| Compounds: | Percent fluorine |
|---|---|
| $FN=CF-N=N-CF_3$ | 59.0 |
| $FN=CF-N=N-CF_2NF_2$ | 58.8 |
| $NF_2CF_2N=N-CF_2NF_2$ | 65.5 |
| $NF_2C(=NF)N=N-CF=NF$ | 50.2 |
| $NF_2C(=NF)N=N-CF_2NF_2$ | 58.6 |
| $NF_2C(=NF)-N=N-CF(NF_2)_2$ | 58.4 |
| $(NF_2)_2CF-N=N-CF(NF_2)_2$ | 64.7 |
| $NF_2C(=NF)N=N-C(=NF)NF_2$ | 51.4 |
| $(NF_2)_2CF-N=N-CF_3$ | 65.5 |
| $(NF_2)_2CF-N=N-C\equiv N$ | 50.2 |
| $NF_2C(=NF)N=N-C\equiv N$ | 37.8 |
| $FN=CF-N=N-C\equiv N$ | 32.2 |
| $\overline{NF_2-CF-NF-CF_2-N=N}$ | 58.8 |
| $\overline{NF_2CF-NF-CF(NF_2)-N=N}$ | 58.6 |
| $\overline{FN=C-NF-C(=NF)-N=N}$ | 37.8 |

The azo derivatives of this invention can be obtained by the fluorination of nitrogenous cyclic or acyclic molecules containing the radical, $-N=N-$ attached to carbon atoms therein.

Examples of such nitrogenous compounds are sym-diamino tetrazine, salts of azodiformamidine and 3,5-diamino-1,2,4-triazole. Thus, bis(difluoramino)fluoro azomethane, for example, is one of the azo compounds formed from sym-diamino tetrazine by a combination of fluorination of certain bonds, replacement of hydrogen and cleavage of the ring by nitrogen-nitrogen bond scission.

Broadly speaking, the process is carried out by treating the described nitrogenous cyclic or acyclic compound with elemental fluorine. For best results, the starting material should be substantially anhydrous, to avoid destruction of the reactive unsaturated group, $>C=NF$ after its formation, and should be diluted with a solid diluent, e.g., sodium fluoride. Sodium fluoride and the like are especially advantageously used to combine with hydrogen fluoride which is formed during the process. The process can be carried out at a temperature in the range of about $-100°$ C. to $+60°$ C., or even somewhat higher. Reaction takes place very slowly at $-100°$ C. and is markedly increased by raising the temperature to $-75°$ C. or higher. The optimum conditions for fluorination usually vary for each starting material, i.e., the described nitrogenous cyclic or acyclic compound. For example, it is preferred that sym-diamino tetrazine be reacted at about $0-25°$ C. and salts of azodiformamidine at $0°$ C. Other compounds containing the azo group, $-N=N-$, may also be used as starting materials.

The direct fluorination process can be conducted by a variety of methods, such as the contact of elemental fluorine with a stationary or agitated bed of the above described starting material or the passage of fluorine through a solution or suspension of the heterocyclic compound. Fluorinations may be carried out under essentially atmospheric pressure, using a flow system or a closed system wherein fluorine under a greater than one atmosphere or pressure is used.

The fluorine is conveniently introduced as a gas under slight positive pressure, or if closed vessels are used, by employing diluents and proper precautions, pressures up to 100 p.s.i. can be used. Preferably, the fluorine is diluted with nitrogen or other inert gas, such as argon, helium, a chlorofluorocarbon, such as dichlorodifluoromethane, and the like, to give about 0.1 to 60 percent of fluorine in the gas stream. Too high a concentration will result in burning of the starting material, and this can be avoided by reduction of the fluorine concentration and/or lowering the reaction temperatures; however, undiluted fluorine can be used, using great caution and slow addition when working with the solid, finely powdered undiluted starting materials. Residual fluorine should always be flushed out of the reactants and the apparatus, using dry nitrogen or the like, to avoid unpleasant and toxic exposure to fluorine as well as untoward effects owing to the strong oxidizing power of this substance. The apparatus used is preferably constructed from Monel, copper or other material inert toward fluorine under ordinary conditions. The solid, finely divided starting material such as diamino tetrazine is placed in a suitable container, such as a boat, which may be of stainless steel or copper or spread on a metal sheet or plate which may be porous to allow the passage of fluorine, and is then contacted with fluorine for a period ranging from about 10 minutes to greater than 8 hours. The time depends on the amount of the starting material, the rate of fluorination and the total amount of fluorine required. The longer times of contact are usually used with more highly diluted fluorine and for large samples in batch operations. Excessive exposure to fluorine, especially when highly concentrated fluorine is used, should be avoided to suppress the possibility of extensive fluorinolysis and reaction of fluorine with the azo functional group. Preferably, the reaction mixture is maintained at a temperature in the range of about $-25°$ to $+25°$ C. When convenient, lower temperatures can be used and it is preferred to use temperatures not in excess of about 50° C.

Since the reactions of fluorine are generally exothermic, care must be taken to control the exotherm by the regulation of temperature, concentration of fluorine as well as the use of liquid diluents, agitation and the like. Liquid diluents which may be used include polyhalogenated compositions inert toward fluorine under ordinary conditions, such as, for example, dichlorodifluoromethane, perfluorooctane, perfluorocyclobutane, perfluorotributylamine and the like.

For best results, the reactant is mixed with from 1 to 4 times its weight of finely divided sodium fluoride or potassium fluoride or the like. Hydrogen fluoride formed in the reaction is taken up by the sodium fluoride in the reaction mixture and need not be removed subsequently from the products by means of a scrubber located downstream from the reactor. The fluorine gas is passed over or through the reaction mixture and the more volatile products including the bulk of the compounds of this invention, as well as smaller fragments, are condensed in a suitable trap cooled by liquid air or other means. The azo compounds of the invention can also remain as a residue in the reactor or in solution when liquid diluents are used. The various azo compounds of this invention are best handled in high vacuum gas transfer systems.

Many of the products produced by the fluorination of the described starting materials can be toxic or explode when subjected to impact, rapid cooling or heating and therefore require safety equipment and special techniques for handling. Generally speaking, ordinary laboratory hoods equipped with ¼ to ½ inch plastic shields provide a safe working area when about one gram of the fluorination product mixture is manipulated, reacted, tested, stored, etc. Protective clothing for the operator such as leather jacket, gloves, face shield and ear plugs is recommended. Larger quantities of the fluorination products should be handled with remote manipulators.

Certain compounds of the invention have a higher tendency to explode when undergoing phase changes when in pure or highly concentrated form. Therefore, the use of a non-flammable slush bath such as a $-111°$ C. bath prepared by mixing liquid nitrogen with trichlorofluoromethane is recommended when said compounds are manipulated in gas transfer systems.

In the direct fluorination process, numerous products are formed, including the products of the invention, excess fluorine and various highly volatile fluorinated cleavage products such as $CF_4$, $NF_3$, etc. The desired products are separated from the mixture and isolated by fractionation procedures including fractional distillation, gas chromatography and the like. They are also separated and can be characterized by vapor phase chromatography, employing an essentially anhydrous fluorochemical stationary phase as more fully described hereinafter. Certain of the compounds may be distilled with great caution under highly reduced pressure; others may be distilled readily at atmospheric pressure.

The azo compounds of the invention are fluid, somewhat shock-sensitive compounds which contain carbon, nitrogen and fluorine but little or no residual hydrogen. They have boiling points in the range of about $-0°$ C. to $+100°$ C. and can be shock-sensitive, but are usually not so sensitive that they cannot be handled conveniently. Their chemical reactivity is variable.

The compounds are soluble in such solvents as methylene chloride, trichlorofluoromethane and the like. They are generally relatively soluble in fluorocarbon solvents such as perfluorooctane and are less soluble in hydrocarbons. When treated with water, or exposed to moisture, they may hydrolyze to a greater or less extent with a lowering or loss of their oxidizing power. The oxidizing capacity of the compounds is determined by contacting the compound with excess potassium iodide in aqueous acetonitrile or acetic acid followed by titration of the iodide released with a standard solution of sodium thiosulfate.

The azo compounds of the invention can be characterized by various spectroscopic analyses. Characteristic infrared absorptions are found in the region of about 9.5 to 11.5 microns which can be complex and broad and are associated at least in part with nitrogen-fluorine bonding, e.g., in groups such as $-NF_2$ and $=NF$. The intensities and complexity of these absorptions can vary widely. Absorptions due to the azo functional group $-N=N-$, which is usually relatively intense, can be found in the region of about 6.3 to 6.6 microns.

Fluorine nuclear magnetic resonance spectroscopic measurements are also useful for the identification of the described compounds. Various types of fluorine-containing groups in the molecule can be distinguished by their shielding values expressed in $\phi$ units, employing $CFCl_3$ as the reference as described by G. Filipovich and G. V. D. Tiers (Journal of Physical Chemistry, vol. 63, pp. 761–762, 1959); the $\phi$ values defined there by the authors are here given simply as $\phi$ values. The difluoroamino groups, $-NF_2$, of the compounds of this invention exhibit shielding values due to the fluorines in the region between about $-10$ to $-60\phi$ and more usually in the region of $-15$ to $-50\phi$. Shielding values due to the fluorine of the group $=NF$, are usually found in the region between $-50$ to $+50\phi$ and sometimes higher.

The azo compounds of the invention are oxidants useful as bleaching agents, explosive ingredients, rocket fuel ingredients, pyrotechnic ingredients and chemical intermediates. In general, the compounds containing nitrogen-fluorine bonds in a high proportion relative to the remainder are especially useful for rocket propellants or explosives, whereas those compounds containing nitrogen-fluorine bonds in a low proportion relative to the remainder are especially useful as bleaching agents. To use the compounds in rocket or pyrotechnic compositions they are mixed with substances which can be oxidized, such as certain organic polymers. They can then be ignited as by means of a squib, whereupon they burn with intense heat and the formation of large volumes of gases.

The reactivity of the azo group is well known and these compounds permit the introduction of high energy groups (e.g., groups containing nitrogen-fluorine bonds) into molecules by free radical reaction. Thus, $$NF_2CF_2N=N-CN$$

upon pyrolysis affords the radical species, $NF_2CF_2 \cdot$ and $\cdot CN$. In the absence of coreactants these radicals combine in various ways, e.g. to form $NF_2CF_2CN$ and $$NF_2CF_2CF_2NF_2$$

in the ratio of about 20:1.

The following examples will more specifically illustrate the fluorinated oxidant compounds of the invention and the process for their preparation.

*Example 1*

An anhydrous mixture of 3 grams of 3,6-diamino-s-tetrazine, and 3 grams of sodium fluoride is placed on a 2 inch by 10 inch sintered plate of Monel which is enclosed in a 0.7 liter brass fluorination reactor. The reactor is attached to a liquid oxygen-cooled borosilicate glass trap which is open at one end. After the reactor is purged with nitrogen, fluorine is allowed to pass through the mixture at a concentration of 5.7 percent by volume in nitrogen for one-half hour, then 10.7 percent for about 2.3 hours, then 9.3 percent for 1.3 hours. The total amount of fluorine used is 0.25 mole and the temperature within the reactor ranges between 22 and 43° C. After the completion of the fluorination, the products are removed in a stream of nitrogen (300 ml. per minute) during 3 hours. The products from the reaction are condensed in the borosilicate glass trap. The total recovered product is separated by vapor phase chromatography on a column of 33 percent by weight of polytrifluorochloroethylene on diatomaceous silica. The higher boiling components are suitably separated by vapor phase chromatography at 50–60° C. Isolation of the pure components of the fluorination mixture is accomplished by vapor phase chromatographic trapping techniques using suitably cooled receivers.

One product of the reaction, $NF_2CF_2-N=N-C\equiv N$, has prominent absorptions in the infrared at about 4.6 microns due to the cyano group, 6.6 microns due to the azo groups and absorptions in the CF and NF region of the spectrum.

Fluorine nuclear magnetic resonance spectroscopy gives the following characteristic shielding values for $$NF_2CF_2-N=N-C\equiv N$$

| φ | Assignment | Approximate Area Ratio |
|---|---|---|
| −19.0 | $NF_2$ | 1 |
| +104.4 | $CF_2$ | 1 |

A sample of $NF_2CF_2-N=N-C\equiv N$ exhibited an absorption maximum at 415 millimicrons in the ultraviolet spectrum and gave a molecular weight of 152 by gas density measurement. Calculated, 156 for $C_2F_4N_4$. The material analyzed as follows:

Calculated for $C_2F_4N_4$: C, 15.4; F, 48.7; N, 35.9. Found: C, 15.4; F, 47.6; N, 35.4.

$NF_2CF_2-N=N-C\equiv N$ upon several weeks standing at 25° C., forms $NF_2CF_2CN$ and $NF_2CF_2CF_2NF_2$ in the approximate ratio of 20:1. The reaction is facilitated by raising the temperature.

Other azo compounds of this invention are also separated from the reaction mixture. Thus, difluoroamino-difluoroazomethane, $NF_2CF_2-N=N-CF_2NF_2$, estimated boiling point 28° C., is also obtained. Difluoroamino-difluoroazomethane shows absorptions at 6.6 microns due to the azo group as well as absorptions in the CF and NF regions of the infrared spectrum.

Fluorine nuclear magnetic resonance spectroscopy gives the following characteristic shielding values for $$NF_2CF_2-N=N-CF_2NF_2$$

| φ | Assignment | Approximate Area Ratio |
|---|---|---|
| −18.9 | $NF_2$ | 1 |
| +102.8 | $CF_2$ | 1 |

A sample of $NF_2CF_2N=N-CF_2NF_2$ gave a molecular weight of 216 by gas density measurement. Calculated for $C_2F_8N_4$, 232.

Cyclic fluorocarbon difluoramino-azo compounds of the invention are also isolated from the fluorination of 3,6-diamino-s-tetrazine.

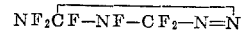

estimated boiling point of 30° C., shows a characteristic absorption at 6.5 microns, due to the azo group, as well as CF and NF absorptions in the infrared spectrum.

The fluorine nuclear magnetic resonance spectrum of

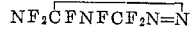

is especially diagnostic for the cyclic structure, and gives the following shielding values:

| φ | Assignment | Approximate Area Ratio |
|---|---|---|
| −22.1 | $NF_2$ | 2 |
| [1] +83.5 | } CF | 1 |
| [1] +84.7 | | |
| +104.8 | NF | 1 |
| +115.8 | $CF_2$ | 2 |

[1] AB pattern

It should be noted that the reaction mixture also contains compounds boiling between 30° C. and 90° C. and having various chain lengths and substitution shown in column 2 hereinabove. These are most conveniently separated and isolated by chromatographic techniques. Thus, the mixture contains other acylic and cyclic azo compounds of the invention, such as $$(NF_2)_2CF-N=N-CF(NF_2)_2$$
$$NF_2C(=NF)-N=N-C(=NF)NF_2$$

and

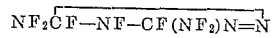

as determined by infrared ultraviolet and nuclear magnetic resonance spectroscopy. The compounds are also isolated by vapor phase chromatographic procedures using higher-boiling components and higher temperature, for example, 50–60° C.

*Example 2*

A mixture of one gram of azodiformamidine dinitrate and four grams of sodium fluoride is placed in a stirred, fluidized bed reactor. A concentration of 10 percent fluorine in nitrogen is passed through the mixture which is maintained at about 0° C. A total of about 0.25 mole of fluorine is delivered at a relatively constant flow rate over a period of 7 hours. The reactor is then allowed to warm to room temperature while flushing with nitrogen over a period of about 2 hours. The product is collected in a borosilicate glass trap cooled with liquid oxygen. The product is partially separated by simple distillation under high vacuum, to yield the crude product having components boiling in the range of about 0° C. to 90° C. Chromatographic separation of the reaction mixture at 50° C. yields $$(NF_2)_2CF-N=N-CF(NF_2)_2$$
$$(NF_2)_2CF-N=N-C(=NF)NF_2$$

and $$NF_2C(=NF)-N=N-C(=NF)NF_2$$

as the higher boiling components of the mixture. These are identified by infrared, ultraviolet and nuclear magnetic resonance spectroscopy.

What is claimed is:

1. A compound containing the azo group and otherwise consisting essentially of nitrogen, carbon and fluorine, the compound having 2 carbon atoms and from 3 to 6 nitrogen atoms, at least one of the nitrogen atoms being fluorinated, the compound being further characterized by containing from about 30 to 70 percent by weight of fluorine and having no carbon-carbon bonds.

2. A compound of the formula $$R-N=N-R'$$

wherein R and R' are monovalent groups each bonded directly to the azo group through a carbon atom therein and otherwise consisting of nitrogen and fluorine, the said compound having from 3 to 6 nitrogen atoms, at least one of the nitrogen atoms being fluorinated, the compound being further characterized by containing from about 30 to 70 percent by weight of fluorine.

3. A compound of the formula $$\underline{R-N=N-R'}$$

wherein R and R' taken together form a ring through the azo group, R and R' each being bonded directly to the azo group through a carbon atom therein and otherwise consisting of nitrogen and fluorine, the said compound having from 3 to 6 nitrogen atoms, at least one of the nitrogen atoms being fluorinated, the compound being further characterized by containing from about 30 to 70 percent by weight of fluorine.

4. The compound having the formula $$NF_2CF_2-N=N-C\equiv N$$

5. The compound having the formula $$NF_2CF_2-N=N-CF_2NF_2N$$

6. The compound having the formula

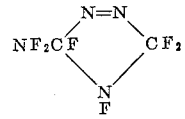

References Cited

Fieser and Fieser, Organic Chemistry, Reinhold Pub. Co., New York, 3rd Ed., 1956, p. 932.

Hoffman et al., Chemical Reviews, vol. 62, p. 15 (1962).

CHARLES B. PARKER, *Primary Examiner.*

CARL D. QUARFORTH, *Examiner.*

L. A. SEBASTIAN, FLOYD D. HIGEL,
*Assistant Examiners.*

UNITED STATES PATENT OFFICE
CERTIFICATE OF CORRECTION

Patent No. 3,326,889                        June 20, 1967

Harvey A. Brown

It is hereby certified that error appears in the above numbered patent requiring correction and that the said Letters Patent should read as corrected below.

Column 4, line 55, for "difluoroamino" read -- difluoramino --; column 8, line 11, the formula should appear as shown below instead of as in the patent:

$$NF_2CF_2-N=N-CF_2NF_2$$

Signed and sealed this 22nd day of October 1968.

(SEAL)
Attest:

Edward M. Fletcher, Jr.                        EDWARD J. BRENNER
Attesting Officer                            Commissioner of Patents